(12) United States Patent
Azzouz et al.

(10) Patent No.: US 12,187,113 B2
(45) Date of Patent: Jan. 7, 2025

(54) VENTILATION DEVICE MODULE FOR A MOTOR VEHICLE COOLING MODULE, VENTILATION DEVICE COMPRISING SUCH A MODULE, AND COOLING MODULE FOR A MOTOR VEHICLE COMPRISING SUCH A VENTILATION DEVICE

(71) Applicant: Valeo Systemes Thermiques, Le Mesnil Saint-Denis (FR)

(72) Inventors: Kamel Azzouz, Le Mesnil Saint Denis (FR); Sébastien Garnier, Le Mesnil Saint Denis (FR); Amrid Mammeri, Le Mesnil Saint Denis (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 0 days.

(21) Appl. No.: 17/787,722

(22) PCT Filed: Dec. 7, 2020

(86) PCT No.: PCT/FR2020/052315
§ 371 (c)(1),
(2) Date: Jun. 21, 2022

(87) PCT Pub. No.: WO2021/123555
PCT Pub. Date: Jun. 24, 2021

(65) Prior Publication Data
US 2023/0147766 A1 May 11, 2023

(30) Foreign Application Priority Data
Dec. 20, 2019 (FR) ...................................... 1915250

(51) Int. Cl.
*B60K 11/04* (2006.01)
*B60K 11/08* (2006.01)
*F01P 5/02* (2006.01)

(52) U.S. Cl.
CPC .............. *B60K 11/04* (2013.01); *B60K 11/08* (2013.01); *F01P 5/02* (2013.01); *F01P 2005/025* (2013.01)

(58) Field of Classification Search
CPC .... B60K 11/08; B60K 11/04; F01P 2005/025; F01P 5/02
See application file for complete search history.

(56) References Cited

U.S. PATENT DOCUMENTS

| 4,519,343 A | * | 5/1985 | Hayashi | .................... F01P 5/06 |
| | | | | 123/41.65 |
| 11,780,321 B2 | * | 10/2023 | Azzouz | ................ B60K 11/085 |
| | | | | 123/41.05 |

FOREIGN PATENT DOCUMENTS

| DE | 102009043028 A1 | 3/2011 | |
| DE | 102013103377 A1 | * 10/2014 | ............. B60K 11/04 |

(Continued)

OTHER PUBLICATIONS

International Search Report and Written Opinion in corresponding International Application No. PCT/FR2020/052315, mailed Apr. 16, 2021 (20 pages).

*Primary Examiner* — Kevin A Lathers
(74) *Attorney, Agent, or Firm* — Osha Bergman Watanabe & Burton LLP (57) ABSTRACT

The invention relates to a module, comprising: —at least one, preferably only one, tangential turbomachine (28-1; 28-2) comprising a bladed wheel (32-1; 32-2) and a motor (33-1; 33-2) for rotationally driving the bladed wheel (32-1; 32-2), —a frame (30-1; 30-2) forming an opening (60-1; 60-2), preferably only one opening, —a shut-off means (62-1; 62-2) designed to selectively shut off the opening (60-1; 60-2), the shut-off means (62-1; 62-2) having at least two regions which, in contact in a position of the shut-off means (62-1; 62-2) in which the opening (60-1; 60-2) is left (Continued)

free, are at a distance apart in a position in which they shut off the opening (60-1; 60-2).

14 Claims, 9 Drawing Sheets

(56) References Cited

FOREIGN PATENT DOCUMENTS

| | | |
|---|---|---|
| DE | 102015012965 A1 | 4/2017 |
| DE | 102017203858 A1 | 9/2018 |
| DE | 102017211577 A1 | 1/2019 |
| JP | S53 139437 U | 11/1978 |

* cited by examiner

VENTILATION DEVICE MODULE FOR A MOTOR VEHICLE COOLING MODULE, VENTILATION DEVICE COMPRISING SUCH A MODULE, AND COOLING MODULE FOR A MOTOR VEHICLE COMPRISING SUCH A VENTILATION DEVICE

TECHNICAL FIELD

The invention relates to a ventilation device for a motor vehicle cooling module and to a cooling module for a motor vehicle, in particular electric, comprising such a ventilation device. The invention also relates to a motor vehicle provided with such a cooling module.

PRIOR ART

Motor vehicles, whether of the combustion engine or electric motor type, have to discharge the heat generated by their operation, and are provided with heat exchangers for this purpose. A motor vehicle heat exchanger generally comprises tubes, in which a heat transfer fluid, in particular a liquid such as water, is intended to circulate, and heat exchange elements connected to these tubes, often designated by the term "fins". The fins are used to increase the exchange surface between the tubes and the ambient air.

However, in order to further increase the heat exchange between the heat transfer fluid and the ambient air, a ventilation device is often used in addition, to generate or increase a flow of air directed toward the tubes and the fins.

In a known manner, such a ventilation device comprises a blower-wheel fan.

The air flow generated by the blades of such a fan is turbulent, in particular because of the circular geometry of the blower wheel, and generally reaches only part of the surface of the heat exchanger (the circular region of the exchanger that faces the blower wheel of the fan). The exchange of heat is therefore not uniform across the entire surface of the tubes and of the fins.

In addition, when it is not necessary for the fan to be switched on (typically when the exchange of heat with non-accelerated ambient air is sufficient to cool the heat transfer fluid circulating in the exchanger), the blades partially obstruct the flow of the ambient air toward the tubes and the fins, thus impeding the circulation of air toward the exchanger and thus limiting the exchange of heat with the heat transfer fluid.

Such a fan also has a relatively large footprint, in particular because of the dimensions of the blower wheel that are necessary in order to obtain effective engine cooling, and this makes incorporating it into a motor vehicle a lengthy and difficult process.

The object of the invention is to at least partially overcome these drawbacks.

SUMMARY OF THE INVENTION

To this end, the invention relates to a ventilation device module for a motor vehicle cooling module, comprising at least one, preferably a single, tangential turbomachine comprising a bladed wheel and a motor for rotating the bladed wheel, a frame forming an opening, preferably a single opening, and shut-off means suitable for selectively shutting off the opening, the shut-off means having at least two regions which are in contact in a position in which the shut-off means leave the opening clear and are separated in a position in which the opening is shut off.

A ventilation device module thus advantageously has a reduced footprint, making it easier to incorporate into a motor vehicle.

In addition, the position in which the shut-off means leaves the opening in the frame clear makes it possible to reduce the pressure losses of the air flow passing through the cooling module, in particular when the tangential turbomachine does not need to be switched on.

According to another aspect, the shut-off means comprise a covering body suitable for being wound on itself about an axis, in order to leave the opening clear.

According to another aspect, the module comprises a motor rotating a shaft fastened to the covering body, so that the rotation of the motor winds the covering body around the shaft.

According to another aspect, the module further comprises winders, connected to the covering body by means of cables, the winders elastically urging the covering body towards the position in which the opening is shut off.

According to another aspect, the movement of the covering body relative to the frame is guided, and in particular the covering body is received in a groove in the frame.

According to another aspect, the covering body is flexible.

According to another aspect, the covering body is a single piece, in the form of a flexible sheet, suitable for covering the opening.

According to another aspect, the tangential turbomachine includes an air guiding portion and an air outlet from the ventilation device module.

According to another aspect, the tangential turbomachine includes an air guiding portion and an air outlet from the ventilation device module.

The invention also relates to a ventilation device for a motor vehicle cooling module, comprising at least one ventilation device module as described above.

According to another aspect, the device comprises two ventilation device modules, each ventilation device module defining a separate opening.

According to another aspect, the turbomachines of the two ventilation device modules are arranged so that the air outlet of the turbomachine of a first ventilation device module is positioned facing the air outlet of the turbomachine of the second ventilation device module.

According to another aspect, the turbomachines of the two ventilation device modules are arranged so that the air outlet of the turbomachine of a first ventilation device module is positioned facing the guiding portion of the turbomachine of the second ventilation device module.

According to another aspect, the turbomachines of the two ventilation device modules are arranged so that the guiding portion of the turbomachine of a first ventilation device module is positioned facing the guiding portion of the turbomachine of the second ventilation device module.

The invention also relates to a cooling module for a motor vehicle, particularly having an electric motor, comprising at least one heat exchanger, and a ventilation device as described above, suitable for creating an air flow through the at least one heat exchanger.

According to another aspect, the volute of each turbomachine comprises a shell consisting of a wall configured to house the bladed wheel and guide the air around the turbomachine to an air outlet, intended to be an air outlet from the cooling module.

According to another aspect, said wall is in the shape of a truncated spiral.

According to another aspect, the module comprises a protective grille, preferably fastened to said opening.

According to another aspect, the frame defines an opening, intended to be positioned facing, in a longitudinal direction of the vehicle, at least part of the heat exchanger of the cooling module. Alternatively, the opening can be intended to be positioned facing a specific heat exchanger.

According to another aspect, the frame comprises a cross-member, which extends on one side of the opening, opposite the side on which the turbomachine is situated.

According to another aspect, the cross-member extends in a transverse direction of the vehicle.

According to another aspect, the covering body can have a limited thickness.

According to another aspect, the covering body is airtight.

According to another aspect, the covering body takes the form of a flexible sheet, the sheet preferably being a single piece.

According to another aspect, the shaft configured to be rotated by the motor extends in the vicinity of a first end of the opening, in the vicinity of said at least one turbomachine.

According to another aspect, the shaft preferably extends in the vicinity of a first end of the opening, in the vicinity of the first or the second turbomachine.

According to another aspect, the covering body is fastened at one end to a bar.

According to another aspect, the bar is mounted slidably on the frame.

According to another aspect, a groove is made in the frame, on each side thereof.

According to another aspect, each groove receives a spur of the bar.

According to another aspect, the covering body is also received in these grooves on each side of the frame.

According to another aspect, the bar is connected, in particular by two cables, to at least one winder.

According to another aspect, the winder is mounted elastically urged to rotate towards a position in which the cables are wound in the associated winder.

According to another aspect, the cables are arranged so that they are wound on pulleys provided in each case between the cross-member and a winder.

According to another aspect, the module is configured so that, in the fully wound position of the cables, the covering body fully covers the opening.

According to another aspect, the covering body forms an angle of between 5° and 20°, preferably substantially equal to 12.5°, with an air intake surface, normal to the flow of air entering the ventilation device.

According to another aspect, the device comprises two modules, and the frame of the ventilation device is made from a single, integral part, a cross-member preferably separating the openings of each module, or alternatively, the frame of the ventilation device is formed by frames of the separate modules, fastened together.

According to another aspect, the turbomachines are positioned so that they are dedicated to respective exchangers.

According to another aspect, the device is configured so that the openings can be just partially shut off.

According to another aspect, the device is configured so that the openings of the two modules can be fully or partially shut off independently of each other.

According to another aspect, the device is configured to make it possible to allow part of an air flow through the opening of a module having smaller dimensions, another part of the air flow being guided towards the turbomachine of another module.

According to another aspect, the covering body is made up of slats connected to each other by articulations so that the slats can be pivoted relative to each other.

According to another aspect, the covering body is arranged so that, in a position in which the opening is left clear, the covering body is wound around a shaft or retracted or folded back.

According to another aspect, the ventilation device 24 comprises two modules or a single module or more than two modules.

BRIEF DESCRIPTION OF THE DRAWINGS

Other features, details and advantages of the invention will become apparent upon reading the detailed description below, and upon analyzing the appended drawings, in which.

DESCRIPTION OF EMBODIMENTS

In the remainder of the description, elements that are identical or perform identical functions have been designated with the same reference sign. In the present description, for the sake of conciseness, these elements are not described in detail in each embodiment. Rather, only the differences between the variant embodiments are described in detail.

The figures show a frame of reference (X, Y, Z). The direction X corresponds to a longitudinal direction of forward travel of the motor vehicle. The transverse direction Y is defined as being perpendicular to the longitudinal direction X. More specifically, the longitudinal X and transverse Y directions can for example belong to a horizontal plane. The direction Z corresponds to a vertical direction.

Figure 1:
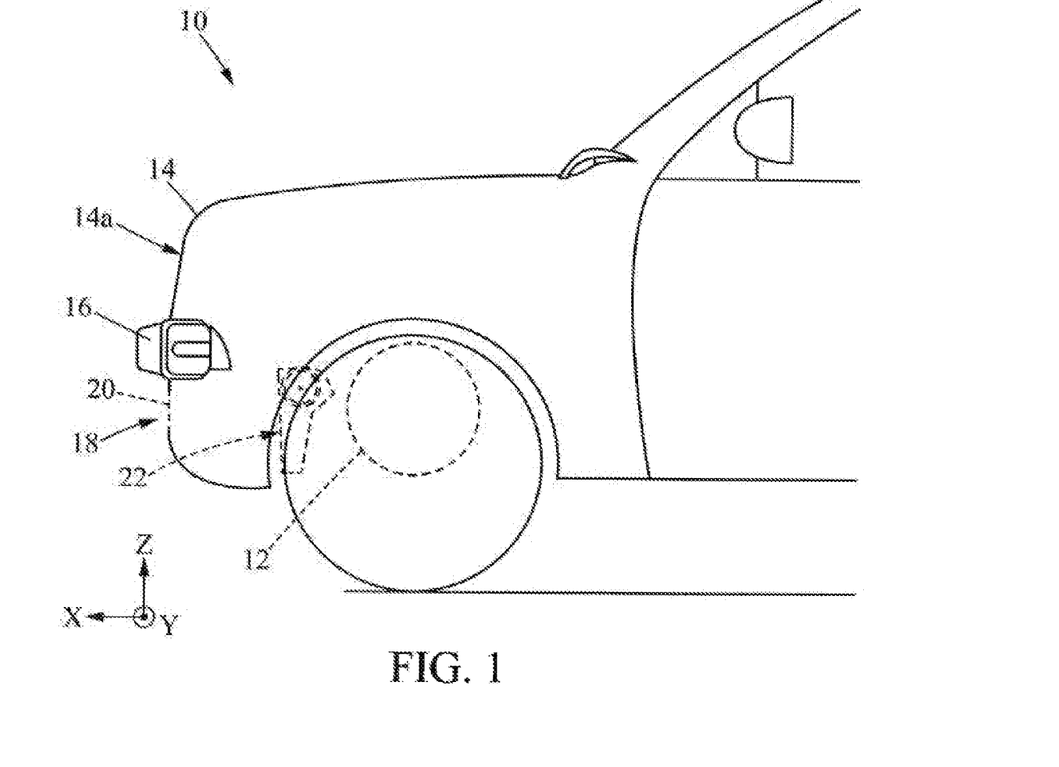
FIG. 1 schematically depicts the front part of a motor vehicle, viewed from the side.

FIG. 1 schematically illustrates the front part of a motor vehicle 10 with a motor 12. The vehicle 10 includes in particular a body 14 and a bumper 16 that are carried by a chassis (not shown) of the motor vehicle 10. The body 14 defines a cooling opening 18, that is, an opening through the body 14. The cooling opening 18 can be a single opening as in the example illustrated. Alternatively, however, the body 14 can define a plurality of cooling openings. Here, the cooling opening 18 is situated in the lower part of the front face 14a of the body 14. In the example illustrated, the cooling opening 18 is situated below the bumper 16. A grille 20 can be positioned in the cooling opening 18 to prevent projectiles from being able to pass through the cooling opening 18. A cooling module 22 is positioned facing the cooling opening 18. The grille 20 in particular provides protection for this cooling module 22.

Figure 2:
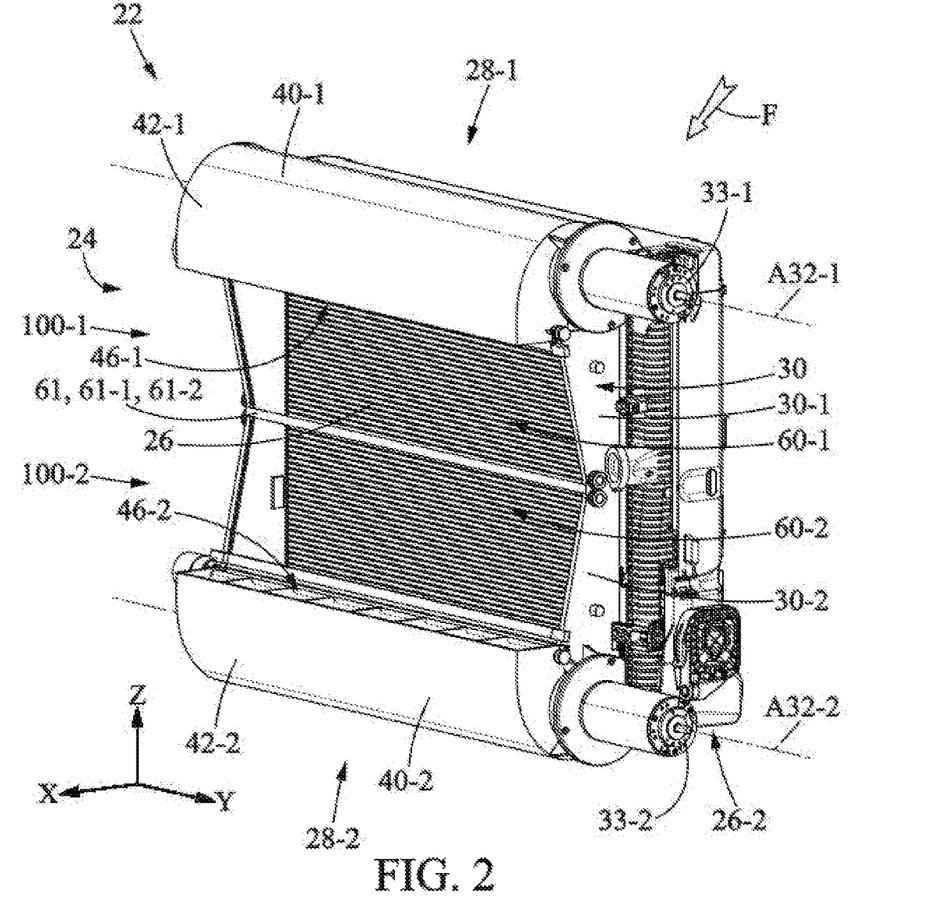
FIG. 2 is a schematic perspective view of a first example of a cooling module, which can be implemented in the motor vehicle in FIG. 1, comprising a ventilation device in a first configuration in which two openings through the frame of the ventilation device are left clear.

The cooling module 22 is more clearly visible in FIG. 2.

The cooling module 22 comprises a ventilation device 24 associated with at least one heat exchanger 26, in this case two heat exchangers 26.

In this case, the two heat exchangers 26 are positioned one behind the other in the longitudinal direction X. Here, the two heat exchangers 26 are identical. Each heat exchanger 26 is generally in the shape of a parallelepiped, the length of which extends parallel to the transverse direction Y, the depth of which extends parallel to the longitudinal direction X, and the height of which extends parallel to the vertical direction Z. Each heat exchanger 26 defines a substantially rectangular surface S, known as the working surface, extending in a plane (Y, Z). The surface S is defined by two opposite sides 26-1, 26-2 corresponding to the length of the exchanger 26 in question, and by another two opposite sides corresponding to the height of the exchanger 26 in question.

It will be noted that the invention is not limited to a particular number of heat exchangers, or to configurations comprising identical heat exchangers only. It is thus possible to juxtapose several heat exchangers vertically and/or horizontally, in which case the height of the surface S is the sum of the heights of the vertically juxtaposed exchangers, and the length of the surface S is the sum of the lengths of the horizontally juxtaposed exchangers.

Figure 3:
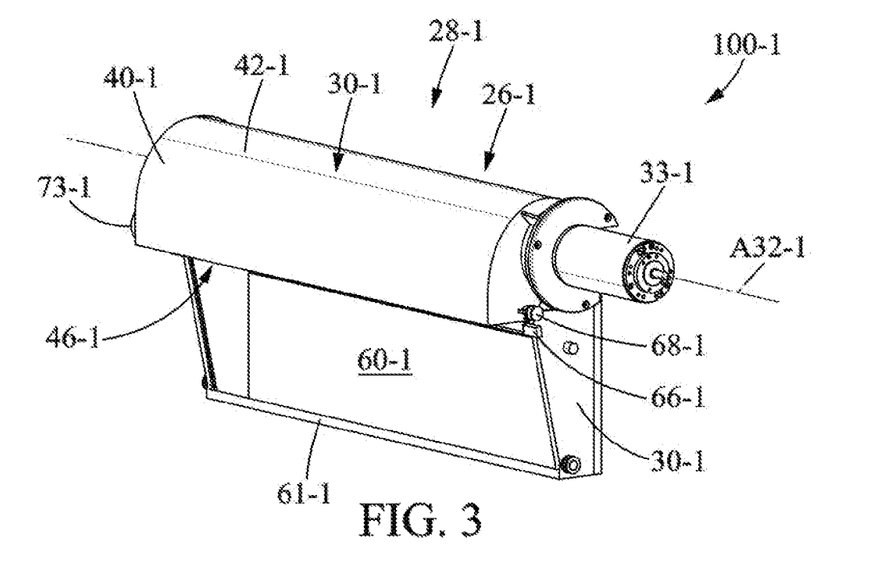
FIG. 3 is a perspective view of a ventilation device module forming the ventilation device in FIG. 3, in a configuration in which an opening through its frame is left clear.
Figure 4:
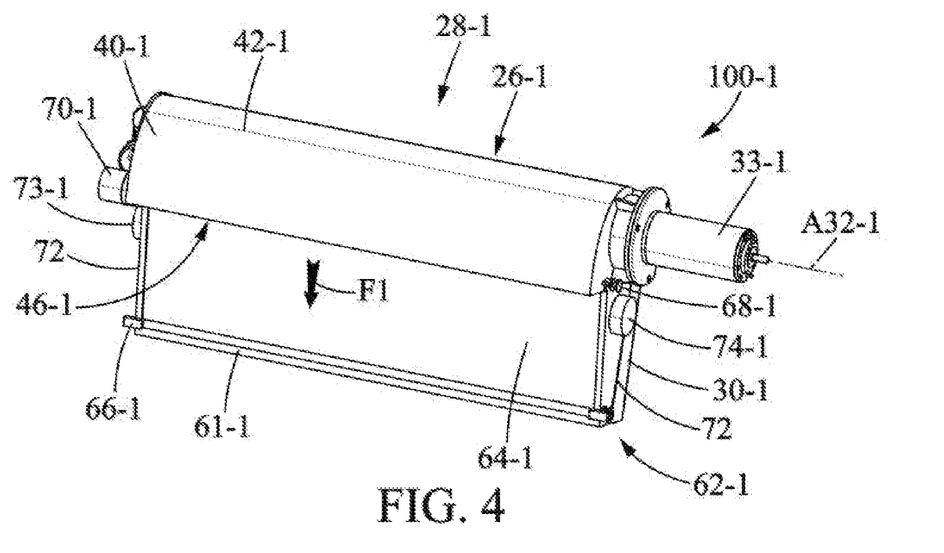
FIG. 4 is a perspective view of the ventilation device module in FIG. 3, in a configuration in which the opening through its frame is shut off.
Figure 5:
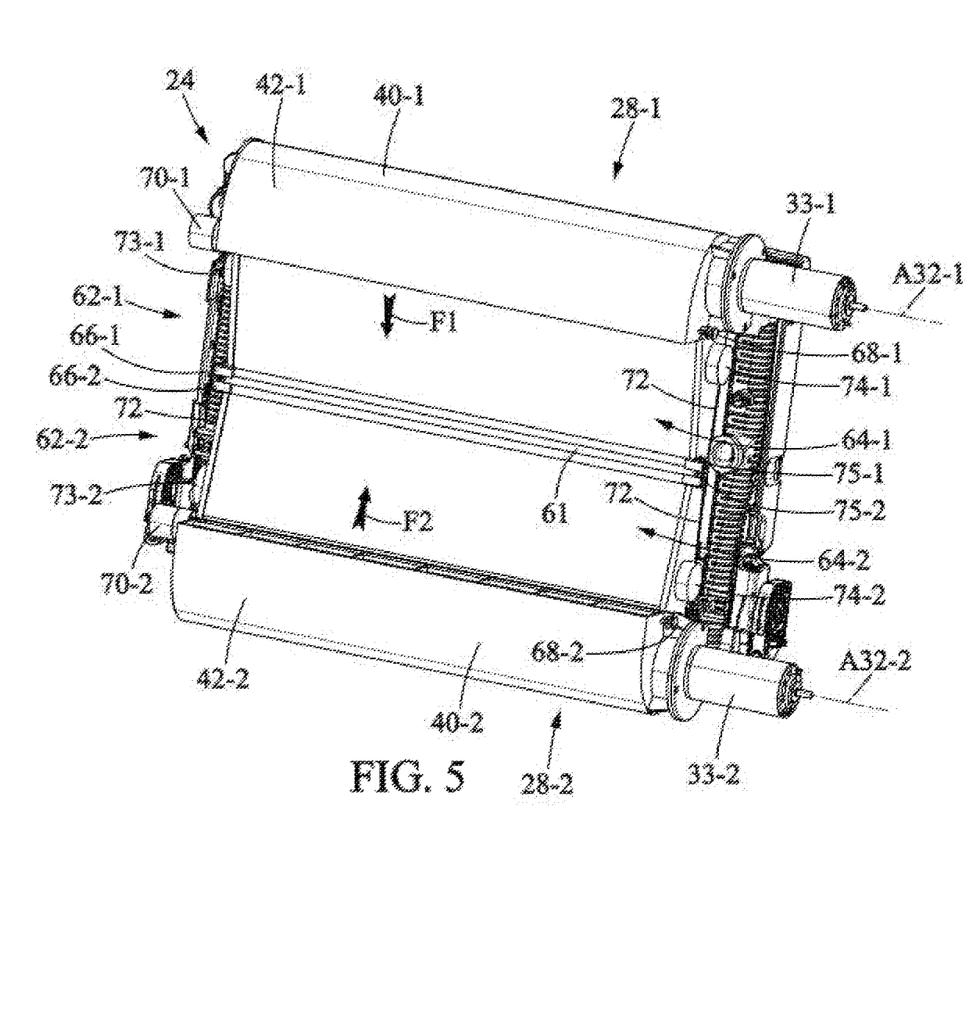
FIG. 5 is a perspective view of the cooling module in FIG. 2, in a second configuration in which the openings through the frame of the ventilation device are shut off.

In addition, here the ventilation device 24 is formed by two ventilation device modules 100-1, 100-2, of the type illustrated in FIGS. 3 and 4.

The module 100-1 in FIGS. 3 and 4 will be described in greater detail below, the module 100-2 being similar. Unless otherwise stated, the elements of the second module 100-2 that are identical to the elements of the first module 100-1, have the same reference sign in the figures, with the suffix "-2" instead of the suffix "-1".

As can be seen in FIG. 3, the module 100-1 comprises a tangential fan 28-1, or more generally a tangential turbomachine, intended to suck in a flow of air in contact with the heat exchangers 26 of the cooling module 22. Of course, the invention is not limited to this configuration, and the turbomachine can be mounted as a blower, in which case the ventilation device is placed between the radiator grille and the exchangers.

The tangential turbomachine 28-1 comprises a rotor 32-1. Here, the rotor consists of a turbine 32-1, more specifically a tangential blower-wheel or bladed wheel. The turbine 32-1 has a cylindrical shape. The turbine 32-1, 32-2 advantageously includes several stages of blades (or vanes). The turbine 32-1 is rotatably mounted about an associated axis of rotation A32-1. The turbine 32-1 is rotated by an associated motor 33-1. Here, the axis of rotation A32-1 of the turbine 32-1 is oriented in the direction of the Y axis.

The module 100-1 also includes a frame 30-1 forming an internal air channel. The frame 30-1 makes it possible to house the turbine 32-1. In one embodiment, a rear portion of the frame 30-1 forms the volute of the tangential turbomachine 28-1.

Here, the volute of the turbomachine 28-1 comprises a shell 40-1 consisting of a wall 42-1 configured to house the bladed wheel 32-1 and guide the air around the turbomachine 28-1 to an air outlet 46-1, intended to be an air outlet from the cooling module 22. In a known manner, the wall 42-1 is in the shape of a truncated spiral.

Advantageously, a grille is fastened to the outlet 46-1. Such a grille makes it possible in particular to prevent projectiles from entering the housing receiving the turbine 32-1 and damaging said turbine 32-1.

As illustrated in FIG. 3, in particular, the frame 30-1 defines an opening 60-1, intended to be positioned facing, in a longitudinal direction X, at least part of the heat exchanger 26 of the cooling module 22. Alternatively, however, the opening 60-1, 60-2 can be intended to be positioned facing a specific heat exchanger 26.

The frame 30-1 comprises a cross-member 61-1, which extends on one side of the opening 60-1, opposite the side on which the turbomachine 28-1 is situated. Here, the cross-member 61-1 extends substantially in the transverse direction Y.

The module 100-1 illustrated in FIGS. 3 and 4 further includes shut-off means 62-1 for shutting off the opening 60-1. The shut-off means 62-1 are suitable for selectively shutting off the opening 60-1. Notably, here, the shut-off means 62 are configured to have at least two regions 63-1, 65-1, which are in contact in a position in which the shut-off means 62-1 leave the opening 60-1 clear and are separated in a position in which the opening 60-1 is shut off.

Figure 6:
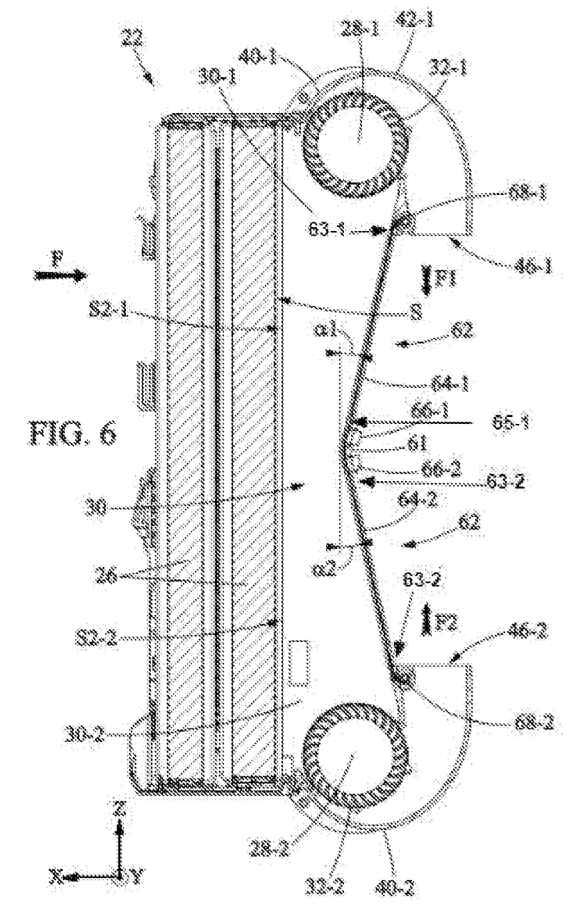
FIG. 6 is a longitudinal cross-sectional view of the ventilation module, in the configuration in FIG. 5.

For example, in FIG. 6, the region 63-1 is not touching the region 65-1, as the shut-off means 62-1 are in the closed position. In the open position (not shown), these two regions would be in contact with each other. The same applies to the shut-off means 62-2, which comprise two similar regions 63-2 and 65-2.

Here, the shut-off means 62 essentially include a covering body 64-1, here in the form of a sheet, fastened at one end to a bar 66-1. The covering body 64-1 is for example made from plastic. The covering body 64-1 is preferably flexible relative to the bar 66-1. The covering body 64-1 can have a limited thickness. The covering body 64-1 is advantageously air-tight. Here, the covering body 64-1 takes the form of a flexible sheet, the sheet preferably being a single piece. At its opposite end to the bar 66-1, the covering body 64-1 is fastened to a shaft 68-1, connected to a motor 70-1. The rotation of the motor 70-1 can thus control the winding of the covering body 64-1 around the shaft 68-1. The shaft 68-1 preferably extends in the vicinity of a first end of the opening 60-1, in the vicinity of the first or the second turbomachine 28-1 respectively. The shaft 68-1 extends parallel to the direction Y, like the axis A32-1 of the turbomachine 28-1.

The bar 66-1 is slidably mounted on the frame 30-1 of the module 100-1. Here, to this end, a groove is made in the frame 30-1, on each side thereof. Each groove receives a spur of the bar 66-1. Advantageously, the covering body 64-1 is also received in these grooves on each side of the frame 30-1.

In addition, the bar 66-1 is connected by two cables 72 to a winder 73-1, 74-1, elastically urged to rotate towards a position in which the cables 72 are wound in the associated winder 73-1, 74-1. The winders 73-1, 74-1 are preferably positioned in the vicinity of the shaft 68-1, the cables 72 being wound on pulleys 75-1 provided in each case between the bar 66-1 and a winder 73-1, 74-1. In the position in which the cables 72 are fully wound in the winders 73-1, 74-1, the covering body 64-1 thus fully covers the opening 60-1, as illustrated in FIG. 3.

The motor 70-1 controls the winding of the covering body 64-1 around the shaft 68-1, to leave the opening 60-1 clear, against the force of the winders 73-1, 74-1. In the absence of any action by the motor 70-1, the winders 73-1, 74-1 make it possible to wind the cables 72 and return the covering body 64-1 to the position in which it shuts off the associated opening 60-1. Intermediate configurations, between the fully shut-off position of the opening 60-1 and the fully retracted configuration of the covering body 64-1 leaving the opening 60-1 completely clear, are possible. These intermediate configurations can be transient, during the transition from one extreme configuration to the other, or maintained over time.

As can be seen in FIG. 6, in the shut-off position, the covering body 64-1, 64-2 forms an angle α1, α2 of between 5° and 20°, preferably substantially equal to 12.5°, with an air intake surface S2-1, S2-2, normal to the flow of air entering the ventilation device 22.

As stated above, the ventilation device illustrated in FIGS. 2 and 5 to 8 is made up of two modules 100-1, 100-2 of the type described above.

Here, the two modules 100-1 and 100-2 are associated so that the frame 30 of the ventilation device 24 is made up of a single, integral part, a cross-member 61 separating the openings 60-1, 60-2. In other words, here, the frames 30-1, 30-2 of the two modules 100-1, 100-2 are formed by a single frame 30 of the ventilation device 24 and a cross-member 61 separating the two openings 60-1, 60-2. According to an alternative embodiment, however, the frame 30 of the ventilation device 24 can be formed by frames 30-1, 30-2 of the separate modules 100-1, 100-2, fastened together.

Here, the two modules 100-1, 100-2 are positioned so that the first and second turbomachines 28-1, 28-2 are mounted parallel to each other, that is, the air flow F1 discharged from the first turbine 32-1 of the first turbomachine 28-1 is separate from the air flow F2 discharged from the second turbine 32-2 of the second turbomachine 28-2. In other words, the air flow F1 discharged from the first turbine 32-1 does not pass through the second turbine 32-2, and vice versa.

In this example, the two modules 100-1, 100-2 are positioned so that the axes of rotation A32-1, A32-2 of the turbines 32-1, 32-2 are parallel to the direction Y. The two turbines 32-1, 32-2 are thus mounted horizontally, in this case in a transverse direction Y. Alternatively, the axes of rotation A32-1, A32-2 can be vertical, namely parallel to the axis Z.

As is also evident from the figures, the axis of rotation A32-1 of the turbomachine 28-1 of a first module 100-1, is positioned substantially facing the upper longitudinal edge 26-1 of the surface S. The axis of rotation A32-2 of the turbomachine 28-2 of the second module 100-2 is positioned substantially facing the lower longitudinal edge 26-2 of the surface S.

Nevertheless, depending on the configuration of the heat exchangers and/or the cooling power required for each exchanger, it is possible to position the turbomachines 28-1, 28-2 so that they are dedicated to respective exchangers 26. Other relative positions of turbomachines 28-1, 28-2 are also possible.

According to the embodiment illustrated in FIGS. 2 and 5 to 8, the outlets 46-1, 46-2 of the turbomachines 28-1, 28-2 of the modules 100-1, 100-2 are positioned facing each other, oriented substantially towards the same point, but in opposite directions. This configuration ensures that a first air flow F1 originating from the first turbomachine 28-1 via the associated first outlet 46-1 is moving substantially towards the same point and in an opposite direction to a second air flow F2 originating from the second turbomachine 28-2 via the associated second outlet 46-2. In this case, the first and second air flows F1 and F2 are substantially vertical.

Each turbomachine 28-1, 28-2 extends along the opening 60-1, 60-2 of the associated module 100-1, 100-2. Each opening 60-1, 60-2 allows at least part of the air flow F that has passed through the heat exchanger(s) 26 to leave the cooling module 22 without passing through one of the turbomachines 28-1, 28-2. The bypassing of the turbomachines 28-1, 28-2 by the air flow F that has passed through the exchanger(s) 26 makes it possible to limit the pressure losses of the air flow F, in particular when the turbomachines 28-1, 28-2 are switched off, for example when the motor vehicle 10 is travelling at high speed, the speed of the vehicle 10 being sufficient to create an air flow F allowing the cooling of the heat exchanger(s) 26.

However, for example at low speed, it can be necessary to switch on one or both of the turbomachines 28-1, 28-2. It is then useful to guide the air flow passing through the heat exchanger(s) 26 through the turbomachine(s) 28-1, 28-2 switched on. In this case, the openings 60-1, 60-2 can be shut off, the shutting off of the openings 60-1, 60-2 also making it possible to guide the air flow towards the turbomachines 28-1, 28-2.

Figure 7:
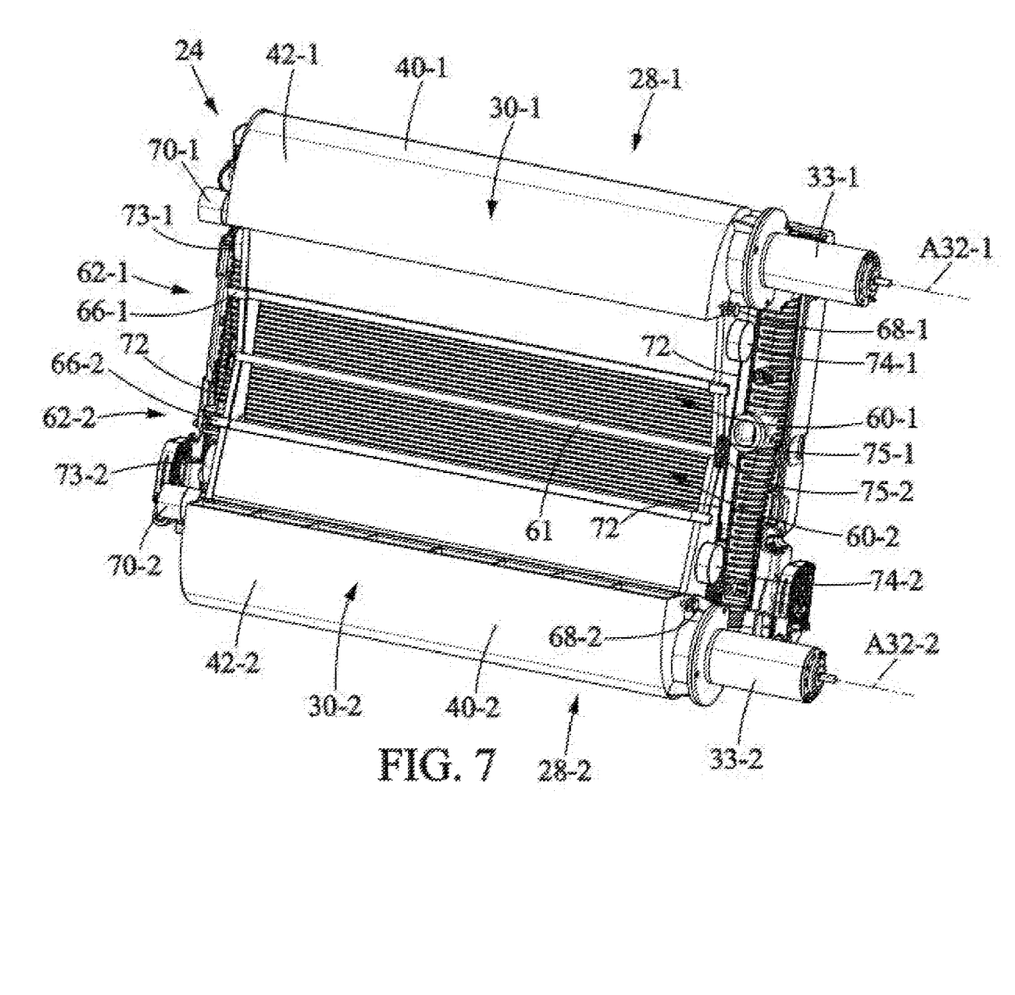
FIG. 7 is a similar view to FIG. 5, in a configuration in which the openings are partially clear.

As illustrated in FIG. 7, the openings 60-1, 60-2 can be just partially shut off.

Figure 8:
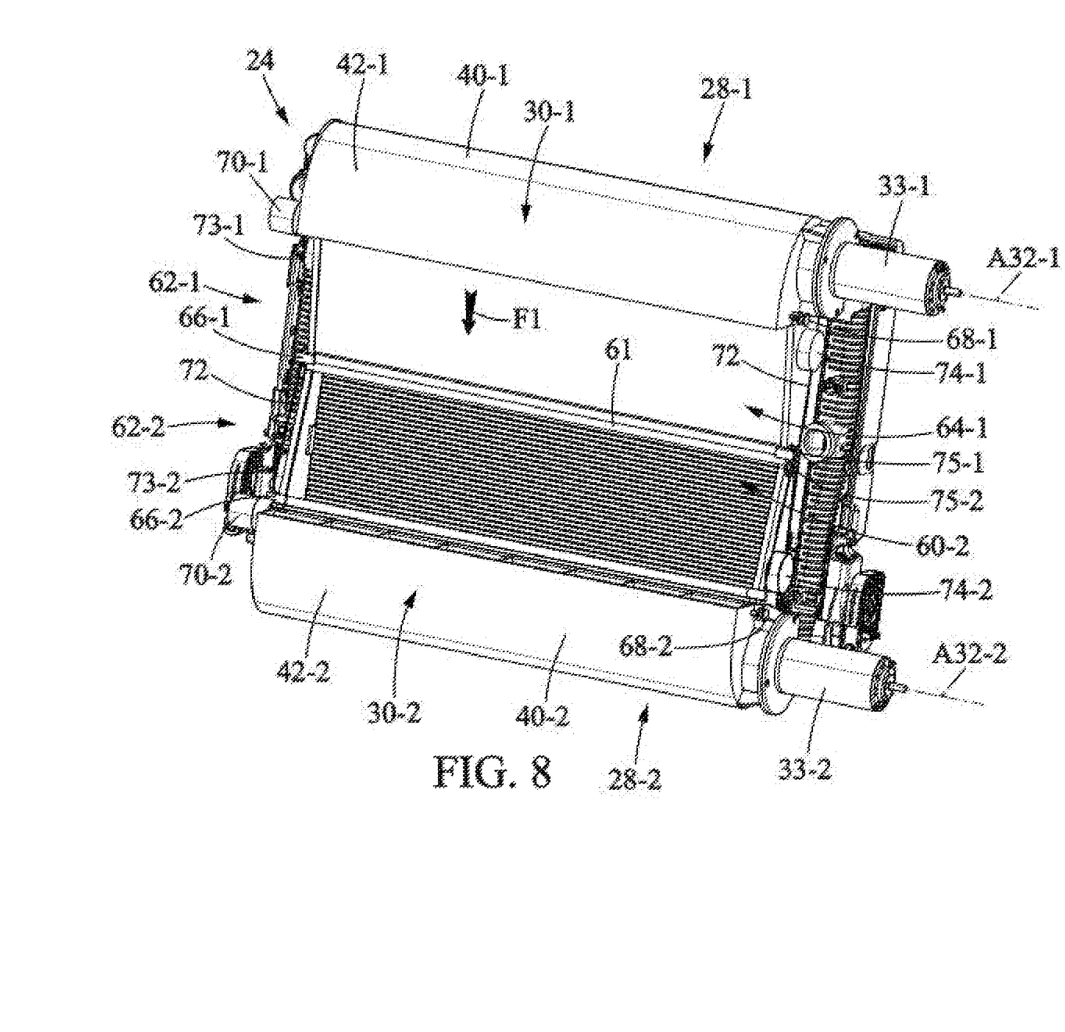
FIG. 8 is a similar view to FIGS. 6 and 7, in another configuration of the ventilation device in which one opening in the frame is left clear while a second opening is shut off.

In addition, as illustrated in FIG. 8, the openings 60-1, 60-2 of the two modules 100-1, 100-2 can be fully or partially shut off, independently of each other. In other words, the shut-off means 62-1, 62-2 of the two modules 100-1, 100-2 are advantageously separate and/or independent. In FIG. 8, it is thus possible in particular for the opening 60-1 of one module 100-1 to be fully or partially shut off, while the opening 60-2 of the other module 100-2 is left fully or partially clear.

In the configuration in which the openings 60-1, 60-2 are shut off by the covering bodies 64-1, 64-2, the covering bodies 64-1, 64-2 make it possible to direct the air flow created towards the turbomachine 28-1, 28-2 of the associated module 100-1, 100-2. By contrast, in the configuration in which the covering bodies 64-1, 64-2 leave the openings 60-1, 60-2 of the two modules 100-1, 100-2 fully open, generally attained when the turbomachines 28-1, 28-2 are switched off, at least part of the air flow created, for example by the speed of the vehicle, on which the cooling module 22 is mounted, can be directed through the openings 60-1, 60-2 in the frame 30, without passing through the turbomachines 28-1, 28-2. The air flow is thus "diverted" from the turbomachines 28-1, 28-2. An intermediate configuration can make it possible to cause part of the air flow to pass through the opening 60-1, 60-2 of a module 100-1, 100-2 having smaller dimensions, another part of the air flow being guided towards the turbomachine 28-1, 28-2 of a module 100-1, 100-2.

Figure 9:
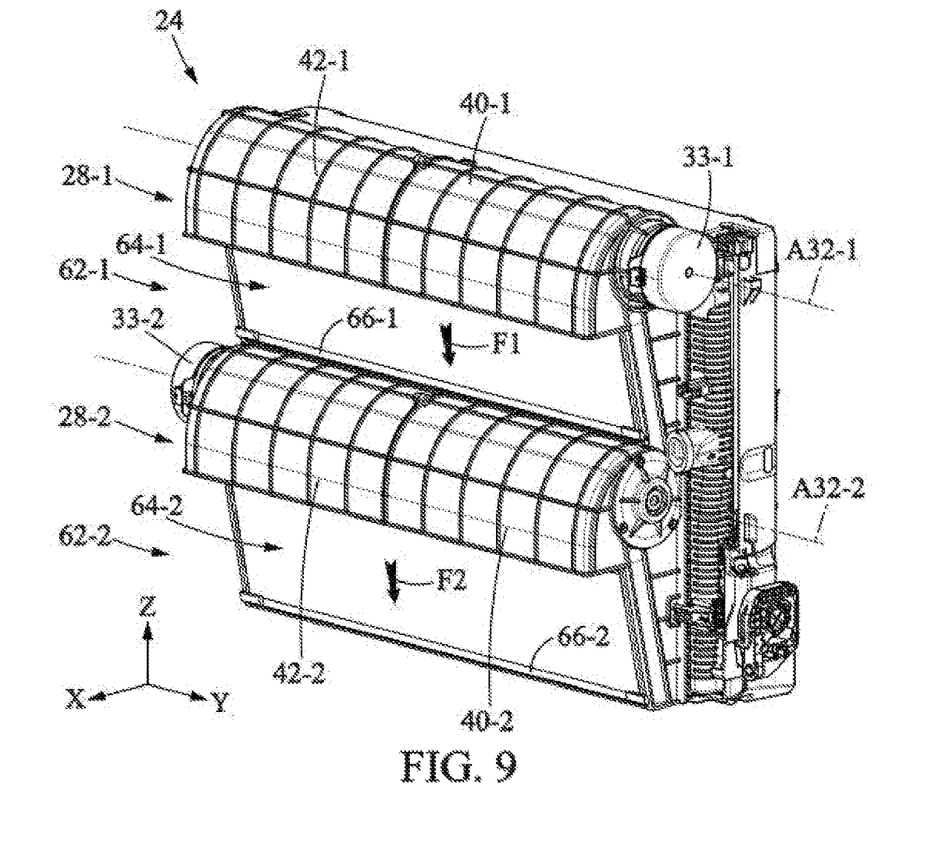
FIG. 9 is a schematic perspective view of a second example of a cooling module, which can be implemented in the motor vehicle in FIG. 1.

FIG. 9 illustrates a second example of a ventilation device 24, in which the two modules 100-1, 100-2 are arranged so that the air outlet 46-1 of the turbomachine 28-1 of a first module 100-1 is positioned facing the guiding portion 42-2 of the turbomachine 28-2 of the second module 100-2. This thus limits the risk of the air flows F1, F2 originating from the two turbomachines 28-1, 28-2 interfering with each other.

Figure 10:
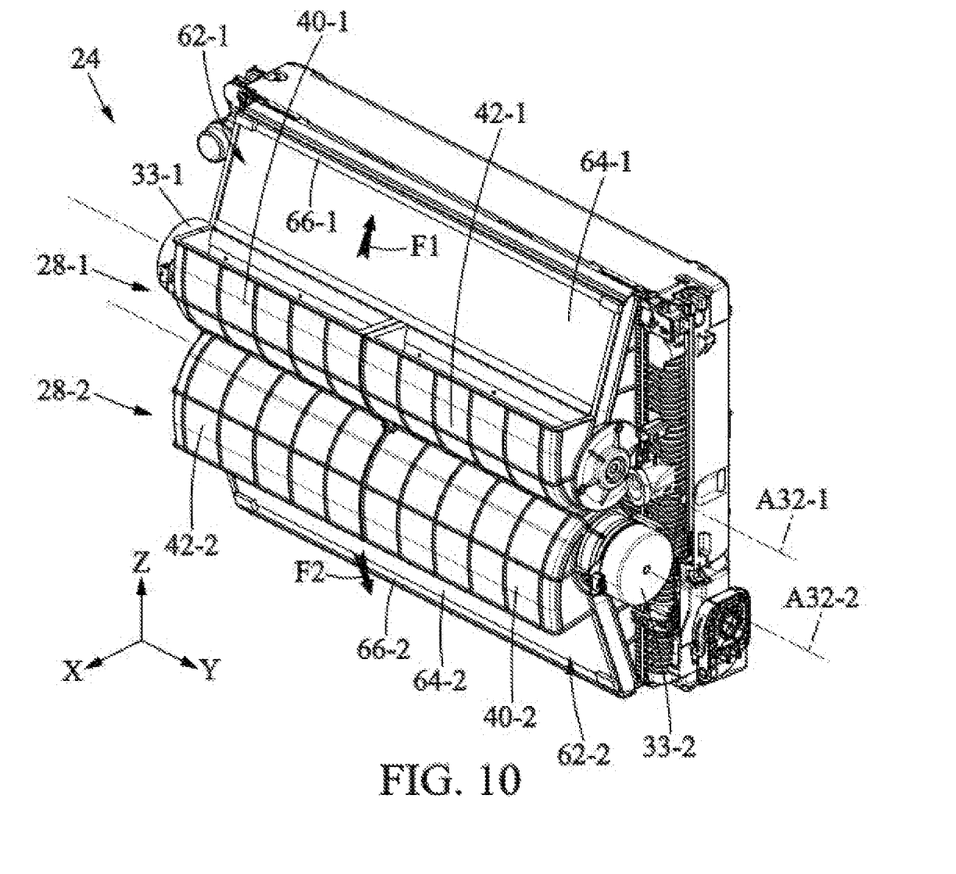
FIG. 10 is a schematic perspective view of a third example module of a cooling module, which can be implemented in the motor vehicle in FIG. 1.

FIG. 10 illustrates a third example of a ventilation device 24, in which the two modules 100-1, 100-2 are arranged so that the guiding portion 42-1 of the turbomachine 28-1 of a first module 100-1 is positioned facing the guiding portion 42-2 of the turbomachine 28-2 of the second module 100-2. Here, the two air outlets 46-1, 46-2 of the two turbomachines 28-1, 28-2 are thus oriented in opposite directions, so that the risk of the air flows F1, F2 originating from the two turbomachines 28-1, 28-2 interfering with each other is further reduced.

The invention is not limited to the examples described above. Rather, the invention can be the subject of numerous variants accessible to a person skilled in the art.

In particular, in the example illustrated, the covering body 64-1, 64-2 is a single piece. Alternatively, the covering body can be made up of slats connected to each other by articulations so that the slats can be pivoted relative to each other.

In addition, in the example illustrated, the covering body moves from the position in which the opening 60-1, 60-2 is shut off to the position in which the opening 60-1, 60-2 is left clear by being wound around a shaft. Alternatively, the covering body can be retracted or folded back.

Likewise, in the example illustrated, the ventilation device 24 comprises two modules 100-1, 100-2. Alternatively, the ventilation device 24 can be made up of a single module 100-1, 100-2 or more than two modules 100-1, 100-2.

The invention claimed is:

1. A module of a ventilation device for a cooling module of a motor vehicle, comprising:
    at least one tangential turbomachine comprising a bladed wheel and a motor for rotating the bladed wheel;
    a frame forming a single opening, wherein the opening faces, in a longitudinal direction of the vehicle, at least part of a heat exchanger of the cooling module; and
    shut-off means for selectively shutting off the opening, the shut-off means having at least two regions, which are in contact in a position in which the shut-off means leave the opening clear and are separated in a position in which the opening is shut off,
    wherein, when the opening is shut off, air flow passing through the heat exchanger in the longitudinal direction does not bypass the at least one turbomachine.

2. The ventilation device module as claimed in claim 1, in which the shut-off means comprise a covering body for being wound on itself about an axis, to leave the opening clear.

3. The ventilation device module as claimed in claim 2, comprising a motor rotating a shaft fastened to the covering body, so that the rotation of the motor winds the covering body around the shaft.

4. The ventilation device module as claimed in claim 3, further comprising winders, connected to the covering body by cables, the winders elastically urging the covering body towards the position in which the opening is shut off.

5. The ventilation device module as claimed in claim 2, in which the movement of the covering body relative to the frame is guided, and in particular the covering body is received in a groove in the frame.

6. The ventilation device module as claimed in claim 2, in which the covering body is flexible.

7. The ventilation device module as claimed in claim 6, in which the covering body is a single piece, in the form of a flexible sheet, suitable for covering the opening.

8. The ventilation device module as claimed in claim 1, in which the tangential turbomachine includes an air guiding portion and an air outlet from the ventilation device module.

9. A ventilation device for a cooling module of a motor vehicle, comprising at least one ventilation device module as claimed in claim 1.

10. The ventilation device as claimed in claim 9, comprising two ventilation device modules, each ventilation device module defining a separate opening.

11. The ventilation device as claimed in claim 10, in which the turbomachines of the two ventilation device modules are arranged so that the air outlet of the turbomachine of a first ventilation device module is positioned facing the air outlet of the turbomachine of the second ventilation device module.

12. The ventilation device as claimed in claim 10, in which the turbomachines of the two ventilation device modules are arranged so that the air outlet of the turbomachine of a first ventilation device module is positioned facing the guiding portion of the turbomachine of the second ventilation device module.

13. The ventilation device as claimed in claim 10, in which the turbomachines of the two ventilation device modules are arranged so that the guiding portion of the turbomachine of a first ventilation device module is positioned facing the guiding portion of the turbomachine of the second ventilation device module.

14. A cooling module for a motor vehicle having an electric motor, comprising:
    at least one heat exchanger; and
    a ventilation device as claimed in claim 9 for creating an air flow through the at least one heat exchanger.

* * * * *